United States Patent
Jung et al.

(10) Patent No.: US 12,167,457 B2
(45) Date of Patent: Dec. 10, 2024

(54) METHOD AND APPARATUS FOR RECEIVING A PDSCH IN RESPONSE TO TRANSMITTING A PRACH PREAMBLE AND A PUSCH

(71) Applicant: Lenovo (Singapore) Pte. Ltd., New Tech Park (SG)

(72) Inventors: Hyejung Jung, Northbrook, IL (US); Ravi Kuchibhotla, Chicago, IL (US); Vijay Nangia, Woodridge, IL (US); Joachim Löhr, Wiesbaden (DE); Alexander Johann Maria Golitschek Edler von Elbwart, Darmstadt (DE); Ebrahim MolavianJazi, Santa Clara, CA (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 1110 days.

(21) Appl. No.: 16/788,264

(22) Filed: Feb. 11, 2020

(65) Prior Publication Data
US 2020/0267772 A1    Aug. 20, 2020

Related U.S. Application Data

(60) Provisional application No. 62/806,745, filed on Feb. 15, 2019.

(51) Int. Cl.
*H04W 74/0833* (2024.01)
*H04L 5/00* (2006.01)
(Continued)

(52) U.S. Cl.
CPC ....... *H04W 74/0833* (2013.01); *H04L 5/0053* (2013.01); *H04W 56/0045* (2013.01);
(Continued)

(58) Field of Classification Search
None
See application file for complete search history.

(56) References Cited

U.S. PATENT DOCUMENTS

2018/0368188 A1* 12/2018 Aiba .................. H04L 5/00
2020/0221505 A1* 7/2020 Agiwal .............. H04W 24/02
(Continued)

OTHER PUBLICATIONS

Heinrich, International Search Report, International Application No. PCT/IB2020/051161, European Patent Office, Rijswijk, NL, Apr. 21, 2020.
(Continued)

*Primary Examiner* — Srinivasa R Reddivalam
(74) *Attorney, Agent, or Firm* — FIG. 1 Patents

(57) ABSTRACT

A RACH configuration including a MsgA PUSCH configuration can be received. An association between a PRACH preamble of a plurality of PRACH preambles and a PUSCH of a plurality of PUSCHs can be determined. A first PRACH preamble can be randomly selected from the plurality of PRACH preambles. The first PRACH preamble and a PUSCH associated with the first PRACH preamble can be transmitted. The PUSCH can be transmitted according to the MsgA PUSCH configuration. A PDSCH can be received in response to transmission of the first PRACH preamble and the PUSCH. A MAC PDU of the PDSCH can include a plurality of RARs of a plurality of different RAR formats. Each of the plurality of RARs can correspond to a MAC-subPDU of the MAC PDU.

20 Claims, 7 Drawing Sheets

(51) Int. Cl.
  H04W 56/00  (2009.01)
  H04W 72/21  (2023.01)
  H04W 72/23  (2023.01)
  H04W 74/00  (2009.01)

(52) U.S. Cl.
  CPC ........... *H04W 72/21* (2023.01); *H04W 72/23* (2023.01); *H04W 74/004* (2013.01); *H04W 74/006* (2013.01)

(56) References Cited

U.S. PATENT DOCUMENTS

2020/0260498 A1* 8/2020 Xu ...................... H04W 74/006
2020/0367288 A1* 11/2020 Dahlman .......... H04W 74/0833

OTHER PUBLICATIONS

Nokia et al: "On 2-step Random Access Procedure", 3GPP Draft; R1-1901192 on 2-Step Random Access Procedure, 3rd Generation Partnership Project (3GPP), Mobile Competence Centre ; 650, Route Des Lucioles ; F-06921 Sophia-Antipolis Cedex ; France vol. RAN WG1, No. Taipei, Taiwan; Jan. 21, 2019-Jan. 25, 2019 Jan. 11, 2019.

Samsung: "Random Access in NR: RAR MAC Subheader Design" 3GPP Draft; R2-1710080 Random Access—RAR MAC Subheader Design, 3rd Generation Partnership Project (3GPP), Mobile Competence Centre ; 650, Route Des Lucioles ; F-06921 Sophia-Antipolis Cedex ; France vol. RAN WG2, No. Prague, Czech Republic; Oct. 9, 2017-Oct. 13, 2017 Oct. 8, 2017.

CATT: "Corrections to NR scheduling and UL transmission procedures" 3GPP Draft; Discussion on Corrections to NR Scheduling and UL Transmission Procedures V2, 3rd Generation Partnership Project (3GPP), Mobile Competence Centre ; 650, Route Des Lucioles ; F-06921 Sophia vol. RAN WGI, No. Spokane, USA; Nov. 12, 2018-Nov. 16, 2018 Nov. 11, 2018.

"3rd Generation Partnership Project; Technical Specification Group Radio Access Network; NR; Physical layer procedures for control (Release 15)", 3GPP Draft; 38213-F40, 3rd Generation Partnership Project (3GPP), Mobile Competence Centre; 650, Route Des Lucioles ; F-06921 Sophia-Antipolis Cedex ; France Jan. 16, 2019.

"3rd Generation Partnership Project; Technical Specification Group Radio Access Network; NR; Medium Access Control (MAC) protocol specification (Release 15)", 3GPP Draft; 38321-F40, 3rd Generation Partnership Project (3GPP), Mobile Competence Centre ; 650, Route Des Lucioles ; F-06921 Sophia Antipolis Cedex; France, Jan. 11, 2019.

3GPP, 3rd Generation Partnership Project; Technical Specification Group Radio Access Network; NR; Physical layer procedures for data (Release 15), 3GPP TS 38.214 V15.4.0 (Dec. 2018), Valbonne—France.

3GPP, 3rd Generation Partnership Project; Technical Specification Group Radio Access Network; NR; Physical layer procedures for control (Release 15), 3GPP TS 38.213 V15.4.0 (Dec. 2018), Valbonne—France.

3GPP, 3rd Generation Partnership Project; Technical Specification Group Radio Access Network; NR; Radio Resource Control (RRC) protocol specification (Release 15), 3GPP TS 38.331 V15.4.0 (Dec. 2018), Valbonne—France.

Samsung, Evaluation results of superposition scheme in case of multiplexing eMBB and URLLC, R1-1609058, 3GPP TSG RAN WG1 Meeting #86bis, Lisbon, Portugal, Oct. 10-14, 2016.

3GPP, 3rd Generation Partnership Project; Technical Specification Group Radio Access Network; NR; Multiplexing and channel coding (Release 15), 3GPP TS 38.212 V15.4.0 (Dec. 2018), Valbonne—France.

3GPP, 3rd Generation Partnership Project; Technical Specification Group Radio Access Network; NR; Medium Access Control (MAC) protocol specification, (Release 15), 3GPP TS 38.321 V15.4.0 (Dec. 2018), Valbonne—France.

ZTE Corporation, New work item: 2-step RACH for NR, RP-182894, 3GPP TSG RAN Meeting #82, Sorrento, Italy, Dec. 10-13, 2018.

Heinrich, European Search Report, European Application No. EP 23 19 3435, European Patent Office, Munich, Germany, Dec. 4, 2023.

Nokia et al: "On 2-step Random Access Procedure", 3GPP Draft; R1-1901192, 3rd Generation Partnership Project (3GPP), Mobile Competence Centre; 650, Route Des Lucioles; F-06921 Sophia-Antipolis Cedex; France, Ran WG1, Taipei, Taiwan; Jan. 11, 2019 (Jan. 11, 2019).

CATT: "Consideration on 2-step RA", 3GPP Draft; R2-1700205, 3rd Generation Partnership Project (3GPP), Mobile Competence Centre; 650, Route Des Lucioles; F-06921 Sophia-Antipolis Cedex ; France, RAN WG2, Spokane, USA; Jan. 17, 2017 (Jan. 17, 2017).

Samsung: "Random Access in NR: RAR MAC Subheader Design", 3GPP Draft; R2-1710080, 3rd Generation Partnership Project (3GPP), Mobile Competence Centre; 650, Route Des Lucioles; F-06921 Sophia-Antipolis Cedex ; France, RAN WG2, Prague, Czech Republic; Oct. 8, 2017 (Oct. 8, 2017).

CATT: "Corrections to NR scheduling and UL transmission procedures", R1-1812605, 3GPP Draft; 3rd Generation Partnership Project (3GPP), Mobile Competence Centre; 650, Route Des Lucioles; F-06921 Sophia-Antipolis Cedex, France, RAN WG1, Spokane, USA; Nov. 11, 2018 (Nov. 11, 2018).

"3rd Generation Partnership Project; Technical Specification Group Radio Access Network; NR; Physical layer procedures for control (Release 15)", 3GPP Draft; 38213-F40, (3GPP TS 38.213 V15.4.0 (Dec. 2018)), 3rd Generation Partnership Project (3GPP), Mobile Competence Centre; 650, Route Des Lucioles; F-06921 Sophia-Antipolis Cedex; France, Jan. 16, 2019 (Jan. 16, 2019).

"3rd Generation Partnership Project; Technical Specification Group Radio Access Network; NR; Medium Access Control (MAC) protocol specification (Release 15)", 3GPP Draft; 38321-F40, (3GPP TS 38.321 V15.4.0 (Dec. 2018)), 3rd Generation Partnership Project (3GPP), Mobile Competence Centre; 650, Route Des Lucioles; F-06921 Sophia-Antipolis Cedex; France, Jan. 11, 2019 (Jan. 11, 2019).

* cited by examiner

METHOD AND APPARATUS FOR RECEIVING A PDSCH IN RESPONSE TO TRANSMITTING A PRACH PREAMBLE AND A PUSCH

BACKGROUND

1. Field

The present disclosure is directed to a method and apparatus for receiving a Physical Downlink Shared Channel (PDSCH) in response to transmitting a Physical Random Access Channel (PRACH) preamble and a Physical Uplink Shared Channel (PUSCH).

2. Introduction

Presently, wireless communication devices, such as User Equipment (UE), communicate with other communication devices using wireless signals. A 2-step random access procedure including a MsgA transmission from a UE and a MsgB reception by the UE can reduce latency related to connection set-up and/or uplink synchronization, and potentially has benefits for channel access in unlicensed spectrum. MsgA includes a PRACH preamble, as well as a PUSCH with data that can also be included in Msg3 of a 4-step random access procedure. MsgB includes at least a random access response message.

The contention based 2-step Random Access Channel (RACH) procedures are specified for Third Generation Partnership Project (3GPP) Release (Rel)-16 New Radio (NR). Unfortunately, restrictions on PRACH resource configuration can increase RACH resource overhead. Also, it may be difficult to distinguish between an Uplink (UL) grant for a new transmission and an UL grant for a re-transmission.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered as limiting of its scope. The drawings may have been simplified for clarity and are not necessarily drawn to scale.

DETAILED DESCRIPTION

At least some embodiments can provide a method and apparatus for receiving a PDSCH in response to transmitting a PRACH preamble and a PUSCH. At least some embodiments can also provide for backward compatible 2-step RACH design. At least some embodiments can also provide methods to construct a random access response message in MsgB, taking into account coexistence between legacy 4-step RACH UEs and Rel-16 UEs capable of performing both 2-step RACH and 4-step RACH. At least some embodiments can also provide for assigning one of reserved PRACH preambles in order to dynamically extend a MAC-subPDU of RAR MAC PDU for a particular purpose. For example, the MAC-subPDU can be extended to include a UE contention resolution ID. Also, or alternatively, the MAC-subPDU can be extended to include two MAC RARs when preamble collision between 2-step RACH UE and 4-step RACH UE is detected by a base station, such as a gNB. Using one or more reserved PRACH preambles to create a backward compatible RAR message format can allow RACH resource sharing between legacy UEs and Rel-16 or beyond UEs capable of performing 2-step RACH procedure, which can provide efficient resource utilization in a cell. At least some embodiments can also provide for RACH resource sharing between Rel-15 NR UEs and Rel-16 NR or beyond UEs. Further, at least some embodiments can allow a network entity to provide a RACH response with a single MAC PDU for 2-step RACH UEs and 4-step RACH UEs for a given time-frequency PRACH occasion without causing any misunderstanding for Rel-15 UEs.

According to a possible embodiment, a RACH configuration including a MsgA PUSCH configuration can be received. An association between a PRACH preamble of a plurality of PRACH preambles and a PUSCH of a plurality of PUSCHs can be determined. A first PRACH preamble can be randomly selected from the plurality of PRACH preambles. The first PRACH preamble and a PUSCH associated with the first PRACH preamble can be transmitted. The PUSCH can be transmitted according to the MsgA PUSCH configuration. A PDSCH can be received in response to transmission of the first PRACH preamble and the PUSCH. A MAC PDU of the PDSCH can include a plurality of RARs of a plurality of different RAR formats. Each of the plurality of RARs can correspond to a MAC-subPDU of the MAC PDU.

Figure 1:
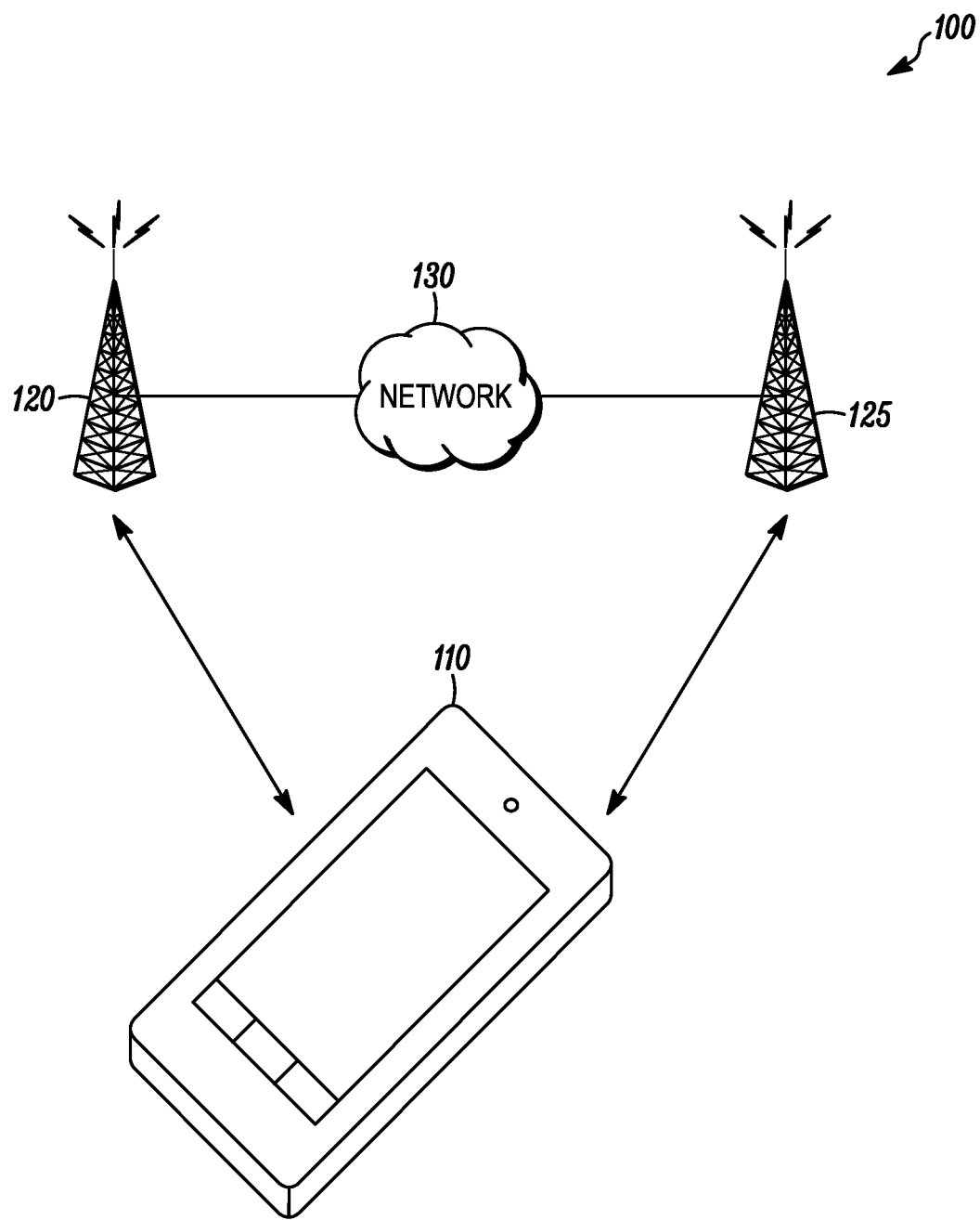
FIG. 1 is an example block diagram of a system according to a possible embodiment.

FIG. 1 is an example block diagram of a system 100 according to a possible embodiment. The system 100 can include a UE 110, at least one network entity 120 and 125, and a network 130. The UE 110 can be a wireless wide area network device, a user device, a wireless terminal, a portable wireless communication device, a smartphone, a cellular telephone, a flip phone, a personal digital assistant, a smartwatch, a personal computer, a tablet computer, a laptop computer, a selective call receiver, an Internet of Things (IoT) device, or any other user device that is capable of sending and receiving communication signals on a wireless network. The at least one network entity 120 and 125 can be a wireless wide area network base station, can be a NodeB, can be an enhanced NodeB (eNB), can be a New Radio (NR) NodeB (gNB), such as a Fifth Generation (5G) NodeB, can be an unlicensed network base station, can be an access point, can be a base station controller, can be a network controller, can be a Transmission/Reception Point (TRP), can be a different type of network entity from the other network entity, and/or can be any other network entity that can provide wireless access between a UE and a network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a NR network, a 3rd Generation Partnership Project (3GPP)-based network, a 5G network, a satellite communications network, a high altitude platform network, the Internet, and/or other communications networks.

In operation, the UE 110 can communicate with the network 130 via at least one network entity 120. For example, the UE 110 can send and receive control signals on a control channel and user data signals on a data channel.

The contention based 2-step RACH procedure can use different implementations. According to a possible implementation, 2-step RACH can operate regardless of whether a UE has valid Timing Advance (TA) or not. According to another possible implementation, 2-step RACH can be applicable to any cell size supported in Rel-15 NR. According to another possible implementation, 2-step RACH can be applied for RRC_INACTIVE, RRC_CONNECTED, and RRC_IDLE state. According to another possible implementation, a contention-based 2-step RACH procedure can be specified.

According to another possible implementation, channel structure of MsgA can be preamble and PUSCH carrying payload. This implementation can only reuse the Rel-15 NR PRACH Preambles design. This implementation can also only reuse the Rel-15 NR PUSCH including Rel-15 Demodulation Reference Signal (DMRS) for transmission of payload of MsgA. This implementation can use no new Cyclic Prefix (CP) length and no sub-Physical Resource Block (PRB) guard subcarrier(s), such as 4.6 us CP up to a cell radius of 690 meters. This can ensure that signal structure optimizations for any specific cell size, such as cells with Round Trip Time (RTT) larger than Rel-15 PUSCH CP duration, are not pursued. This implementation can specify the mapping between the PRACH preamble and the time-frequency resource and DMRS of PUSCH in MsgA. PRACH Preamble and PUSCH in a MsgA can be Time Division Multiplexed (TDMed). This implementation can specify the supported Modulation and Coding Scheme(s) (MCS(s)) and time-frequency resource size(s) of PUSCH in MsgA. This implementation can consider the MsgA payload contents determined by Radio Access Network (RAN) Working Group (WG) 2 (RAN2). This implementation can specify power control of PUSCH of MsgA.

According to another possible implementation, the content of MsgA can be specified to include the equivalent contents of Msg3 of 4-step RACH. Inclusion of Uplink Control Information (UCI) in MsgA may not be precluded. According to another possible implementation, the content of MsgB can be specified to include the equivalent contents of msg2 and msg4 of 4-step RACH. Contention resolution can be used for 2-step RACH. Design of RNTI can be determined for MsgB of 2-step RACH. According to another possible implementation, the fall back procedure from 2-step RACH to 4-step RACH can be specified. According to another possible implementation, all triggers for Rel-15 NR 4-step RACH can be applied for 2-step RACH except for System Information (SI) request and Beam Failure Recovery (BFR). According to another possible implementation, no new triggers may be used for 2-step RACH.

If a network entity configures a first set of RACH occasions, such as time-frequency PRACH occasions, for UEs capable of 2-step RACH procedure such that the first set of RACH occasions is different from a second set of RACH occasions configured for UEs that cannot perform 2-step RACH procedure, such as legacy UEs, and does not include any RACH occasion also being included in the second set of RACH occasions and if the Rel-15 Random Access-Radio Network Temporary Identifier (RA-RNTI) formula is re-used for 2-step RACH, then a PDSCH carrying a RAR message can be intended either only to legacy UEs or only to UEs capable of performing 2-step RACH procedure. Thus, a new format of MAC RAR for MsgB, with a size being different than the legacy MAC RAR, can be defined for 2-step RACH procedure. However, this restriction on PRACH resource configuration may increase RACH resource overhead and accordingly, a design approach to enable sharing of RACH occasions between 2-step RACH UEs and 4-step RACH UEs can be used. The above-mentioned Rel-15 RA-RNTI formula re-used for 2-step RACH can be based on the RA-RNTI being determined based on the index of the first Orthogonal Frequency Division Multiplexing (OFDM) symbol of the PRACH occasion, the index of the first slot of the PRACH occasion in a system frame, the index of the PRACH occasion in the frequency domain, and the UL carrier used for Random Access Preamble transmission.

Several options to distinguish a legacy RACH response message from a response message of the 2-step random access procedure can be used. One option can include preamble partitioning between 2-step RACH and 4-step RACH. Preamble partitioning can increase the preamble collision probability and accordingly, reduce PRACH capacity. Another option can include using a reserved bit in the legacy RACH response message to indicate the 2-step RACH response message. Another option can include using a different formula to calculate RA-RNTI for 2-step RACH than the RA-RNTI formula used for the legacy 4-step RACH procedure. Also, when using the different RA-RATI formula for 2-step RACH, a network entity, such as a gNB, can create and send a separate MAC PDU in a separate PDCCH and PDSCH for 2-step RACH UEs and 4-step RACH UEs, respectively, for a given time-frequency PRACH occasion, which can increase radio resource overhead.

Different methods can be used for contention resolution in 2-step RACH procedure. One method can include including an indicator that distinguishes between a UL grant for a retransmission and an initial transmission in the UL grant field of RAR. Another method can include a variable size MAC RAR with an extension bit to include a UE contention resolution identity. In Rel-15 NR, a MAC RAR can have only 1 reserved bit. Thus, without preamble partitioning or separate MAC PDUs based on separate PDCCHs and PDSCHs for 2-step RACH UEs and 4-step RACH UEs, it may be difficult to include the indicator distinguishing between UL grant for a new transmission and UL grant for a re-transmission. In a single MAC PDU for 2-step RACH UEs and 4-step RACH UEs for a given time-frequency PRACH occasion, the variable size MAC RAR for 2-step RACH UEs may not cause any misunderstanding for Rel-15 UEs, if a backward compatible RAR design is used.

Details on possible contents of RAR UL grant, a formula to determine RA-RNTI, RAR MAC PDU including MAC subheaders for backoff indicator and PRACH preamble identity and a MAC payload, such as MAC RAR, are provided below.

A RAR UL grant can schedule a PUSCH transmission from the UE. Example contents of the RAR UL grant, starting with the MSB and ending with the LSB, are given in Table 1.

TABLE 1

Random Access Response Grant Content field size

| RAR grant field | Number of bits |
| --- | --- |
| Frequency hopping flag | 1 |
| PUSCH frequency resource allocation | 14 |
| PUSCH time resource allocation | 4 |
| MCS | 4 |
| TPC command for PUSCH | 3 |
| CSI request | 1 |

If the value of the frequency hopping flag is 0, the UE can transmit the PUSCH without frequency hopping. Otherwise, the UE can transmit the PUSCH with frequency hopping. The UE can determine the MCS of the PUSCH transmission from the first sixteen indexes of an applicable MCS index table for PUSCH. The TPC command value $\delta_{msg2,b,f,c}$ can be used for setting the power of the PUSCH transmission. In a non-contention based random access procedure, the CSI request field in the RAR UL grant can indicate whether or not the UE includes an aperiodic CSI report in the corresponding PUSCH transmission. In a contention based random access procedure, the CSI request field can be reserved.

The RA-RNTI associated with the PRACH occasion in which the random access preamble is transmitted can be computed as $$RA\text{-}RNTI = 1 + s\_id + 14 \times t\_id + 14 \times 80 \times f\_id + 14 \times 80 \times 8 \times ul\_carrier\_id$$

where s_id can be the index of the first OFDM symbol of the PRACH occasion (0≤s_id<14), t_id can be the index of the first slot of the PRACH occasion in a system frame (0≤t_id<80), f_id can be the index of the PRACH occasion in the frequency domain (0≤f_id<8), and ul_carrier_id can be the UL carrier used for random access preamble transmission, which can be 0 for a Normal Uplink (NUL) carrier, and 1 for a Supplementary Uplink (SUL) carrier.

Figure 2:
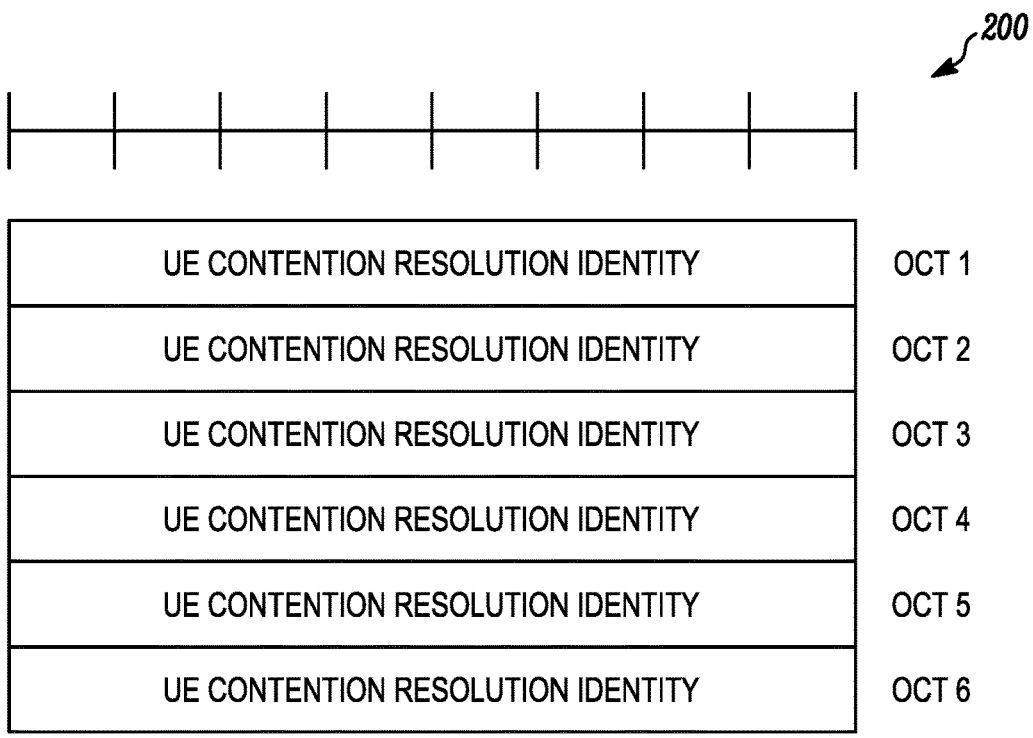
FIG. 2 is an example illustration of a UE contention resolution identity Medium Access Control (MAC) Control Element (CE) according to a possible embodiment.

FIG. 2 is an example illustration 200 of a UE contention resolution identity MAC CE according to a possible embodiment. The UE contention resolution identity MAC CE can be identified by MAC PDU subheader with a Logical Channel ID (LCID). It can have a fixed 48-bit size and can include of a single field of a UE contention resolution identity. This field can contain the UL Common Control Channel (CCCH) Service Data Unit (SDU). If the UL CCCH SDU is longer than 48 bits, this field can contain the first 48 bits of the UL CCCH SDU.

A MAC PDU for a RAR can include one or more MAC subPDUs and optional padding. Each MAC subPDU can include a MAC subheader with a Backoff Indicator (BI) only, a MAC subheader with Random Access Preamble Identity (RAPID) only, such as acknowledgment for SI request, and a MAC subheader with RAPID and MAC RAR.

Figure 3:
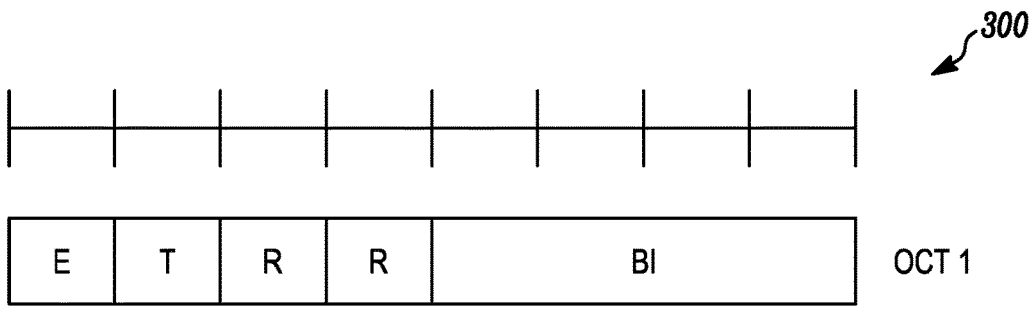
FIG. 3 is an example illustration of a MAC subheader according to a possible embodiment.
Figure 4:
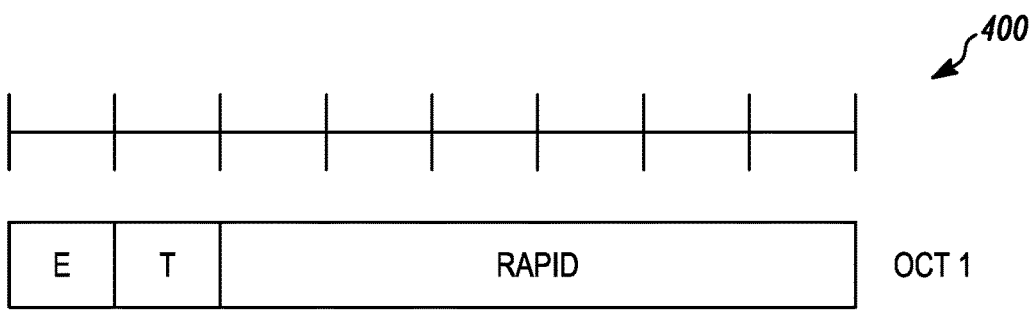
FIG. 4 is an example illustration of an MAC subheader according to a possible embodiment.
Figure 5:
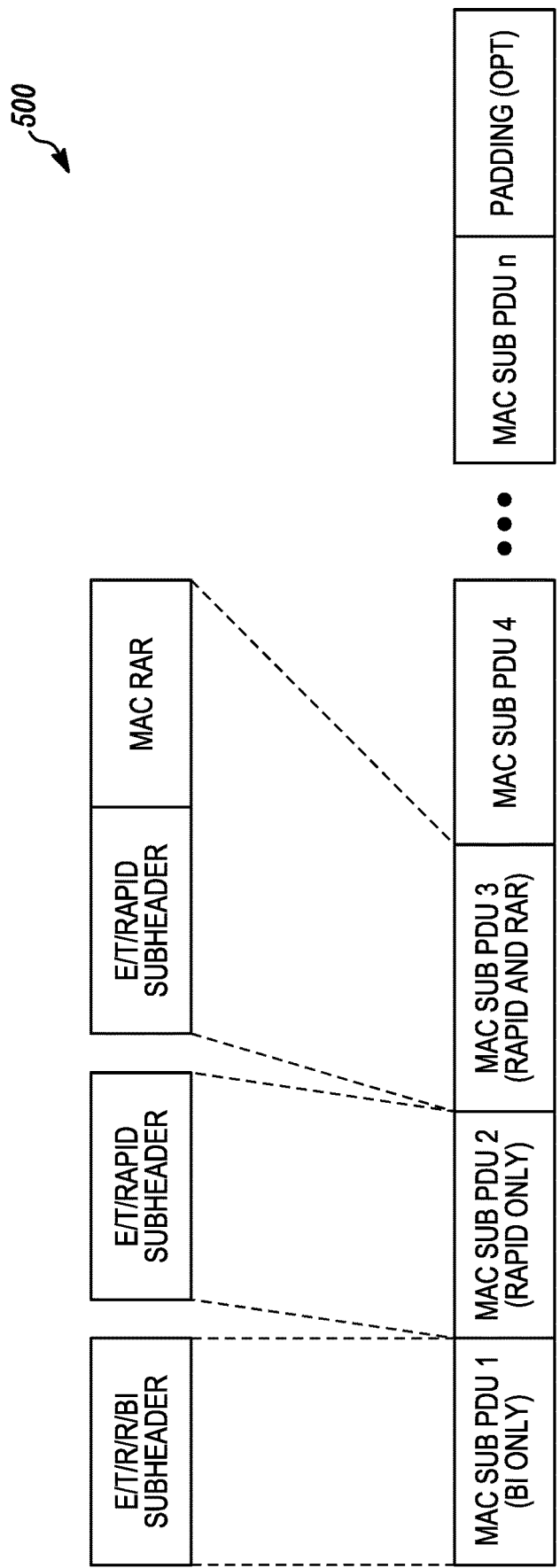
FIG. 5 is an example illustration of a MAC Protocol Data Unit (PDU) including MAC Random Access Responses (RARs) according to a possible embodiment.

FIG. 3 is an example illustration 300 of an E/T/R/R/BI MAC subheader according to a possible embodiment. A MAC subheader with BI can include five header fields E/T/R/R/BI. A MAC subPDU with BI only can be placed at the beginning of the MAC PDU, if included. 'MAC subPDU(s) with RAPID only' and 'MAC subPDU(s) with RAPID and MAC RAR' can be placed anywhere between a MAC subPDU with BI only, if any, and padding, if any. FIG. 4 is an example illustration 400 of an E/T/RAPID MAC subheader according to a possible embodiment. A MAC subheader with RAPID can include three header fields E/T/RAPID. FIG. 5 is an example illustration 500 of a MAC PDU including MAC RARs according to a possible embodiment. Padding can be placed at the end of the MAC PDU if present. Presence and length of padding can be implicit based on Transport Block (TB) size and the size of the MAC subPDU(s).

The MAC subheader for a RAR can include different fields. The MAC subheader for a RAR can include an Extension (E) field that is a flag indicating if the MAC subPDU including this MAC subheader is the last MAC subPDU or not in the MAC PDU. The E field can be set to "1" to indicate at least another MAC subPDU follows. The E field can be set to "0" to indicate that the MAC subPDU including this MAC subheader is the last MAC subPDU in the MAC PDU. The MAC subheader for a RAR can include a Type (T) field that can be a flag indicating whether the MAC subheader contains a RAPID or a BI. The T field can be set to "0" to indicate the presence of a BI field in the subheader. The T field can be set to "1" to indicate the presence of a RAPID field in the subheader. The MAC subheader for a RAR can include a Reserved (R) bit that can be set to "0". The MAC subheader for a RAR can include a BI field that can identify the overload condition in the cell. The size of the BI field can be 4 bits. The MAC subheader for a RAR can include a RAPID field that can identify the transmitted random access preamble. The size of the RAPID field can be 6 bits. If the RAPID in the MAC subheader of a MAC subPDU corresponds to one of the random access preambles configured for SI request, the MAC RAR may not be included in the MAC subPDU. The MAC subheader can be octet aligned.

Figure 6:
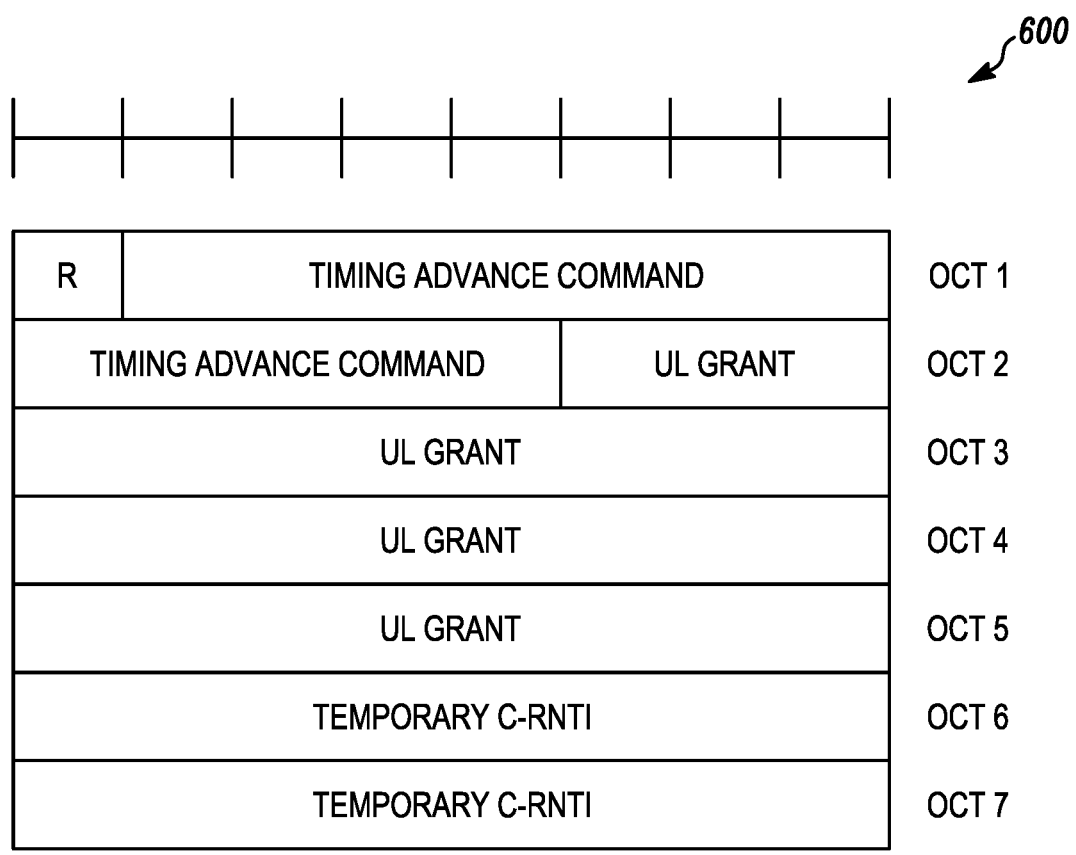
FIG. 6 is an example illustration of a MAC RAR according to a possible embodiment.

FIG. 6 is an example illustration 600 of a MAC RAR according to a possible embodiment. For the MAC payload of the RAR, the MAC RAR can be of fixed size. The MAC RAR can include a Reserved (R) bit field, which can be set to "0". The MAC RAR can include a TA command field that can indicate the index value, $T_A$, used to control the amount of timing adjustment that the MAC entity has to apply. The size of the TA command field can be 12 bits. The MAC RAR can include an UL Grant field that can indicate the resources to be used on the uplink. The size of the UL Grant field can be 27 bits. The MAC RAR can include a Temporary Cell Radio Network Temporary Identifier (TC-RNTI) field that can indicate the temporary identity that is used by the MAC entity during Random Access. The size of the TC-RNTI field can be 16 bits. The MAC RAR can be octet aligned.

To accommodate RACH resource sharing, such as time-frequency PRACH occasions and preambles sharing, between Rel-15 NR UEs and Rel-16 NR or beyond UEs, it can be assumed that a reserved bit in Rel-15 NR MAC RAR is set to '1' to indicate that the MCA RAR is for a UE performing a 2-step RACH procedure. If there is preamble collision between a legacy UE, such as a Rel-15 UE performing 4-step RACH, and a UE performing 2-step RACH and if a network entity was able to detect only the PRACH preamble transmitted by the UE performing 2-step RACH and transmit the MAC RAR with the reserved bit set to '1', the expected Rel-15 UE behavior or implementation can be to consider the received RAR as an error case.

According to a possible embodiment, a range of allowed TA values can be reduced with a reduced number of bits for the TA Command field in a MAC RAR for 2-step RACH and one of the bits that can become available from bit-width reduction of the TA Command field can be used for indication of HARQ-ACK feedback of MsgA PUSCH. This can be used for contention-resolution when there is preamble collision among 2-step RACH UEs. That is, if the acknowledgement is indicated as MsgA PUSCH HARQ-ACK feedback, only a 2-step RACH UE that is able to match its identity, such as its Cell Radio Network Temporary Identifier (C-RNTI) or contention resolution ID, with the identity, such as the C-RNTI or contention resolution ID, received in the MAC RAR or an extended MAC RAR, can perform uplink transmission according the UL grant indicated in the MAC or the extended MAC RAR. If the non-acknowledgement is indicated as MsgA PUSCH HARQ-ACK feedback, one or more 2-step RACH UEs that have transmitted a corresponding PRACH preamble can perform uplink transmissions according to the indicated UL grant in the MAC RAR, as in the 4-step random access procedure.

A UE can identify whether MsgA PUSCH is correctly decoded by a network entity by checking whether TC-RNTI is the same as C-RNTI included in MsgA, if the UE has included C-RNTI in the MsgA. The UE can identify whether MsgA PUSCH is correctly decoded by the network entity by checking whether a contention resolution ID included in the extended MAC RAR is the same as a contention resolution ID included in MsgA, if the UE has included the contention resolution ID in MsgA.

Since 2-step RACH procedure can be performed by UEs with smaller propagation delay, such as a UE which has a round-trip propagation delay within a cyclic prefix length of MsgA PUSCH, the range of TA values for 2-step RACH can be reduced compared to the range of TA value for 4-step RACH.

At least some embodiments can provide dynamically extendable MAC-subPDU while accommodating coexistence between legacy 4-step RACH UEs and 2-step RACH UEs. According to a possible embodiment, a MAC-subPDU for RAR MAC PDU can be dynamically extended in a backward compatible manner, such as without causing any misunderstanding for legacy UEs, by using one or more reserved PRACH preambles that are configured with none of usages of contention-based random access, contention-free random access, and System Information (SI) request. A UE can receive configuration information or association information between a reserved PRACH preamble and a given format or a set of contents of MAC RAR, where the reserved PRACH preamble can be used for a network entity to append an additional MAC RAR of the associated format or associated set of contents such that a MAC subheader with RAPID of the reserved PRACH preamble and a MAC RAR of the associated format can be appended to a legacy MAC-subPDU, such as BI only, non-reserved RAPID only, and non-reserved RAPID and RAR. For example, the MAC-subPDU in a RAR message can be extended to include more information without disrupting Rel-15 UE operation according to the following examples, where '+' can denote sequential appending for payload construction.

An example extended MAC-subPDU can include a MAC subheader with RAPID1+MAC RAR for 4-step RACH, which can be the same as Rel-15 MAC RAR, +MAC subheader with RAPID2+MAC RAR for 2-step RACH. RAPID1 can be a PRACH preamble ID that is configured for both 2-step RACH and 4-step RACH. The MAC RAR for 4-step RACH can have one reserved bit in Rel-15 MAC RAR set to 0. RAPID2 can be a reserved PRACH preamble ID that is not configured for contention-based RACH, contention-free RACH, and/or SI request and is configured for indicating the addition of a MAC RAR for 2-step RACH. The MAC RAR for 2-step RACH can have one reserved bit in Rel-15 MAC RAR set to 1. When a gNB clearly detects preamble collision between a 2-step RACH UE and a 4-step RACH UE because of a large propagation delay difference between the 2-step RACH UE and the 4-step RACH UE, the gNB can respond to both UEs' preamble transmission with the above extended MAC-subPDU.

Another example extended MAC-subPDU can include a MAC subheader with RAPID1+MAC RAR for 2-step RACH+MAC subheader with RAPID2+MAC RAR including a UE contention resolution ID. RAPID1 can be a PRACH preamble ID that is configured at least for 2-step RACH. The MAC RAR for 2-step RACH can have one reserved bit in Rel-15 MAC RAR set to 1. RAPID2 can be a reserved PRACH preamble ID that is not configured for contention-based RACH, contention-free RACH, and/or SI request and is configured for indicating the addition of a MAC RAR comprising a UE Contention Resolution ID. The MAC RAR including the UE contention resolution ID can be of the same size as Rel-15 MAC RAR. When a gNB detects a PRACH preamble and successfully decodes a corresponding MsgA PUSCH and identifies a UE contention resolution ID from a transport block of the MsgA PUSCH, then the gNB can transmit the above extended MAC-subPDU.

According to a possible embodiment, all the newly specified MAC RAR formats can have the same size as a legacy MAC RAR format, such as 56 bits. For example, a MAC RAR format for a UE contention resolution identity of 48 bits can have 8 reserved bits or can include other fields occupying the remaining 8 bits.

According to a possible embodiment, if a UE is configured to use a subset of PRACH preambles or the entire set of PRACH preambles associated with a given time-frequency PRACH resource, such as a given RACH occasion, for both 2-step RACH and 4-step RACH procedures, then the UE can receive two MAC RARs associated with one random access preamble identity in a PDSCH carrying RAR MAC PDU, where one MAC RAR can be for 2-step RACH and the other MAC RAR can be for 4-step RACH. The UE can differentiate the MAC RAR type according to an indication in a bit field of the MAC RAR or based on the order of MAC RARs, which can be predefined or configured, such as with a MAC RAR for 4-step RACH followed by MAC RAR for 2-step RACH. In case there is preamble collision between 2-step RACH UE, such as UE1, and 4-step RACH UE, such as UE2, a gNB may or may not detect the preamble collision. If the gNB can detect preamble collision thanks to larger propagation delay differences between UE1 and UE2, the gNB can include two MAC RARs associated with the same RAPID in a RAR MAC-subPDU.

For 2-step RACH, in one implementation, the gNB can exploit both correlation of PRACH preamble and correlation of Demodulation Reference Signal (DMRS) of MsgA PUSCH to detect a UE performing 2-step RACH. For example, the gNB can combine PRACH preamble-based correlation and PUSCH DMRS based correlation as a detection metric.

According to other possible embodiments, in response to a PRACH transmission, if a UE performing 4-step RACH detects a DCI format 1-0, which can scheduling of PDSCH in one cell, with CRC scrambled by a corresponding RA-RNTI during a RAR window, successfully decodes a transport block in a corresponding PDSCH, such as when CRC checking passes, within the RAR window, passes the transport block to higher layers, parses the transport block in higher layers, identifies a random access preamble identity associated with the PRACH transmission, and determines the corresponding MAC RAR as being valid, the UE can consider that RAR is received successfully.

According to other possible embodiments, a UE can be indicated by the higher-layer parameter MsgA-transform-Precoder whether or not the UE shall apply transform precoding for a MsgA PUSCH transmission. For example, the UE can be indicated this as part of MsgA PUSCH configuration information. The MsgA PUSCH configuration can be similar to Rel-15 NR Type1-uplink configured grant or Type2-uplink configured grant configurations.

The UE can transmit the PRACH and the MsgA PUSCH on a same uplink carrier of a same serving cell. The UE can transmit a transport block in MsgA PUSCH according to a configured UL grant using redundancy version number 0. MsgA PUSCH retransmissions, if any, of the transport block can be scheduled by a DCI format 0_0 with CRC scrambled by a TC-RNTI provided in the corresponding MsgB, such as the RAR message. If slot aggregation is configured for a configured UL grant of MsgA PUSCH, the UE can transmit the MsgA PUSCH with repetitions.

For Power control aspects for MsgA PUSCH transmission, in LTE and also NR Rel-15, the Closed Loop Power Control (CL-PC) can be reset, for loop index l=0, upon receiving the RAR. Further, the UE can set the initial value f(0,l) of the CL-PC for l=0 for Msg3 based on the minimum of the total power ramp-up requested by higher layers from the first to the last random access preamble and the power headroom to get saturated to Pcmax with taking into account a TPC command received in RAR. According to a possible embodiment, CL-PC, for l=0, can be reset whenever MsgA, that is, a PRACH preamble and a PUSCH associated with the PRACH preamble, is transmitted.

According to another possible embodiment, the initial value f(0,l) for CL-PC for l=0 for MsgA PUSCH can be based on the minimum of the total power ramp-up requested by higher layers from the first to the latest random access preamble and the power headroom to get saturated to Pcmax without taking into account any previously received TPC command. If the UE transmits a MsgA in 2-step RACH procedure on active UL Bandwidth Part (BWP) b of carrier f of serving cell c, $$f_{b,f,c}(0, l) = \Delta P_{rampup,b,f,c}, \text{ where } l = 0$$

and $$\Delta P_{rampup,b,f,c} = \min\left\{\left[\max\left(0, P_{CMAX,f,c} - \begin{pmatrix} 10\log_{10}(2^\mu \cdot M_{RB,b,f,c}^{PUSCH}(0)) + \\ P_{O\_PUSCH,b,f,c}(0) + \alpha_{b,f,c}(0) \cdot \\ PL_c + \Delta_{TF,b,f,c}(0) \end{pmatrix}\right)\right], \Delta P_{rampuprequested,b,f,c}\right\}$$

$\Delta P_{rampuprequested,b,f,c}$ can be provided by higher layers and corresponds to the total power ramp-up requested by higher layers from the first to the latest random access preamble for carrier f in the serving cell c. $M_{RB,b,f,c}^{PUSCH}(0)$ can be the bandwidth of the PUSCH resource assignment expressed in number of resource blocks for the MsgA PUSCH transmission on active UL BWP b of carrier f of serving cell c.

$\Delta_{TF,b,f,c}(0)$ can be the power adjustment of the MsgA PUSCH transmission on active UL BWP b of carrier f of serving cell c.

Figure 7:
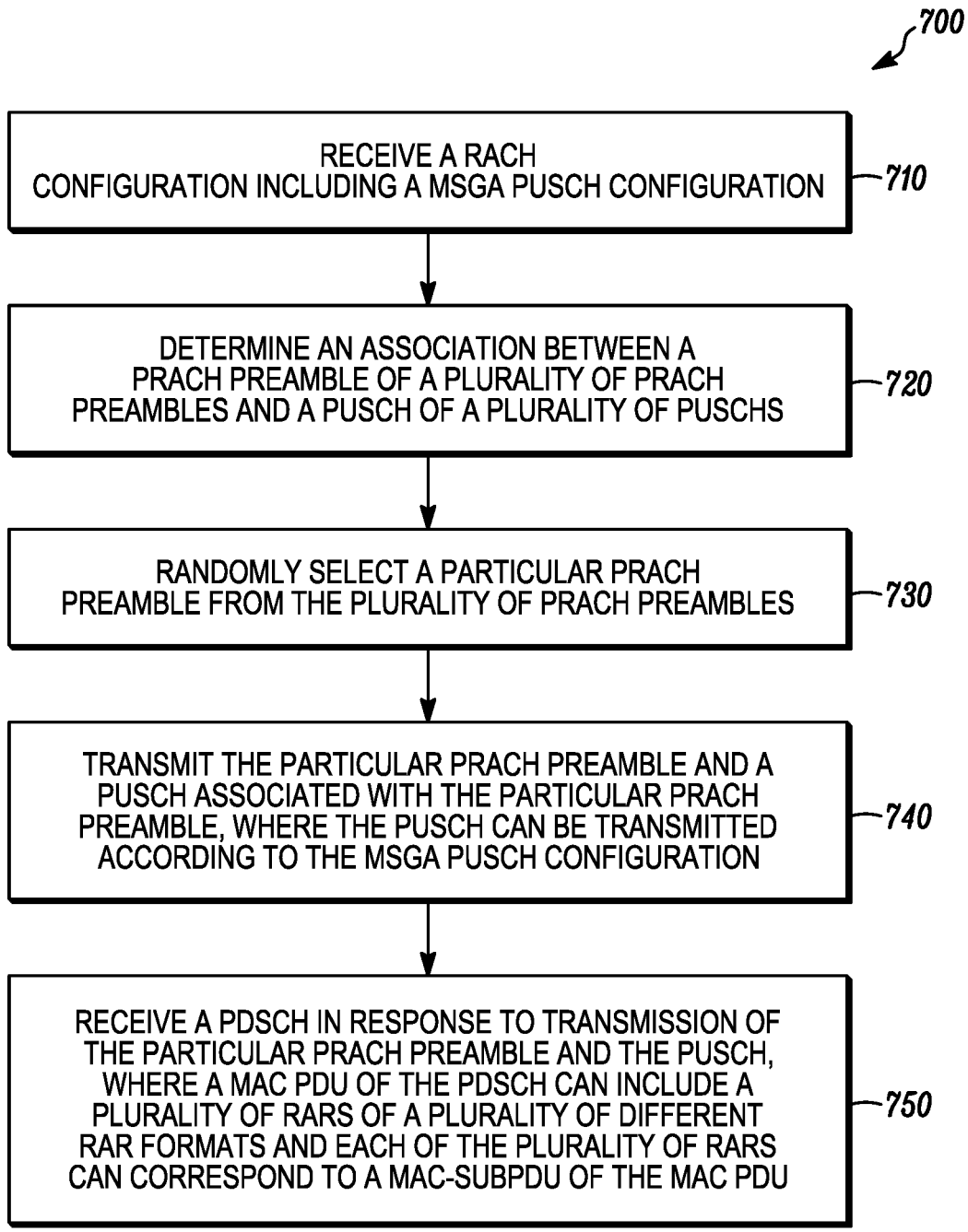
FIG. 7 is an example flowchart illustrating the operation of a wireless communication device according to a possible embodiment.

FIG. 7 is an example flowchart 700 illustrating the operation of a wireless communication device, such as the UE 110, according to a possible embodiment. At 710, a RACH configuration including a MsgA PUSCH configuration can be received. The MsgA PUSCH configuration can be a PUSCH configuration used for transmitting a RACH message from the UE to a network entity in a two-step random access procedure. For example, the MsgA PUSCH configuration can be a PUSCH configuration including a time and frequency resource configuration and a DMRS configuration that can be used for transmitting a RACH message that can include a UE identity. The MsgA PUSCH configuration can include an indication of whether or not to apply transform precoding to a MsgA PUSCH transmission. The indication of whether or not to apply transform precoding can be received via a higher-layer parameter, where a higher-layer is higher than a physical layer. For example, the higher-layer parameter can be an RRC parameter.

At 720, an association between a PRACH preamble of a plurality of PRACH preambles and a PUSCH of a plurality of PUSCHs can be determined. According to a possible implementation, the RACH configuration can include a configuration of a plurality of reserved PRACH preambles and the plurality of PRACH preambles may not include any of the plurality of reserved PRACH preambles.

At 730, a particular PRACH preamble can be randomly selected from the plurality of PRACH preambles. The plurality of PRACH preambles and the association between the PRACH preamble of the plurality of PRACH preambles and the PUSCH of the plurality of PUSCHs can be determined based on the RACH configuration.

At 740, the particular PRACH preamble and a PUSCH associated with the particular PRACH preamble can be transmitted. The PUSCH can be transmitted according to the MsgA PUSCH configuration.

At 750, a PDSCH can be received in response to transmission of the particular PRACH preamble and the PUSCH. A MAC PDU of the PDSCH can include a plurality of RARs of a plurality of different RAR formats. Each of the plurality of RARs can correspond to a MAC-subPDU of the MAC PDU. A RAR format of the plurality of RAR formats can correspond to a 4-step random access procedure. A RAR format of the plurality of RAR formats can also correspond to a 2-step random access procedure.

According to a possible embodiment, the PUSCH can be a first PUSCH. A second PUSCH can be transmitted according to an UL grant. A MAC subheader of a RAR of the plurality of RARs can include at least a preamble identity of the particular PRACH preamble. A MAC RAR of the RAR can include at least the UL grant.

According to a possible embodiment, a particular RAR format of the plurality of RAR formats can include a preamble identity of a particular reserved PRACH preamble of the plurality of reserved PRACH preambles. A content of a RAR of the particular RAR format can be determined based on the particular reserved PRACH preamble. The configuration of the plurality of reserved PRACH preambles can include association information of an association between a reserved PRACH preamble of the plurality of reserved PRACH preambles and a RAR format of the plurality of different RAR formats. The content of the RAR can be determined based on the particular RAR format associated with the particular reserved PRACH preamble.

According to a possible embodiment, a transmit power of the PUSCH associated with the particular PRACH preamble can be determined based on a default power adjustment state, l=0, and an initial value, $f_{b,f,c}(0, 1)$, of the default power adjustment state for closed-loop power control, which can be based on $$\Delta P_{rampup,b,f,c} = \left[\left\{\min\left\{\max\left(0, P_{CMAX,f,c} - \begin{pmatrix} 10\log_{10}(2^{\mu} \cdot M_{RB,b,f,c}^{PUSCH}(0)) + \\ P_{O\_PUSCH,b,f,c}(0) + \alpha_{b,f,c}(0) \cdot \\ PL_c + \Delta_{TF,b,f,c}(0) \end{pmatrix}\right)\right\}\right]\right.$$

$$\Delta P_{rampuprequested,b,f,c}\right].$$

$\Delta P_{rampuprequested,b,f,c}$ can be provided by higher layers and can correspond to the total power ramp-up requested by higher layers from a first to a latest random access preamble for an active UL BWP b of a carrier f in a serving cell c. The higher layers can be higher than a physical layer. $M_{RB,b,f,c}^{PUSCH}(0)$ can be a bandwidth of a PUSCH resource assignment corresponding to the PUSCH expressed in number of resource blocks on the active UL BWP b of the carrier f of the serving cell c. $\Delta_{TF,b,f,c}(0)$ can be a power adjustment of the PUSCH associated with the particular PRACH preamble transmission on the active UL BWP b of carrier f of the serving cell c. $P_{CMAX,f,c}$ can be a UE configured maximum output power for the carrier f of the serving cell c in a PUSCH transmission occasion of the physical uplink shared channel. $P_{O\_PUSCH, b,f,c}(0)$ and $\alpha_{b,f,c}(0)$ can be open-loop power control parameters for the active UL BWP b of the carrier f of the serving cell c. $PL_c$ can denote a pathloss of the serving cell c. For example, the initial value f(0,l) for CL-PC for l=0 for MsgA PUSCH can be based on the minimum of the total power ramp-up requested by higher layers from the first to the latest random access preamble and the power headroom to get saturated to Pcmax without taking into account any previously received TPC command.

Figure 8:
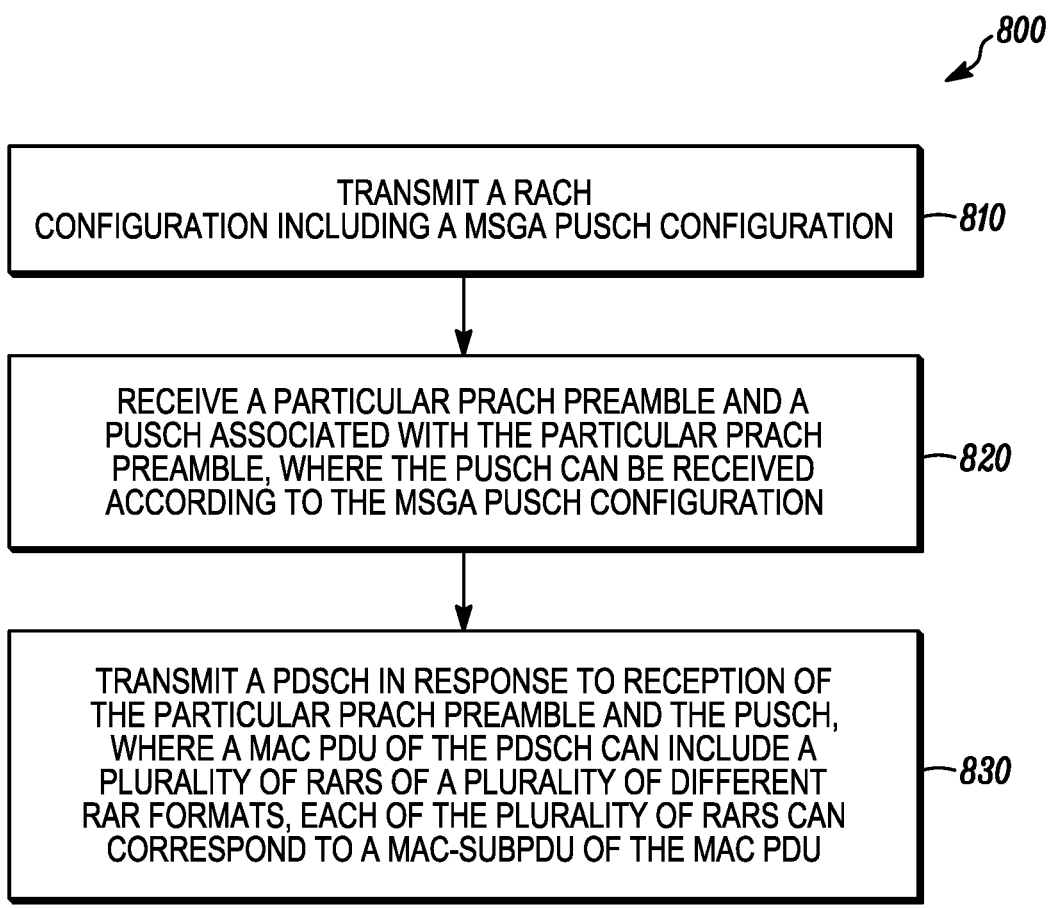
FIG. 8 is an example flowchart illustrating the operation of a wireless communication device according to a possible embodiment.

FIG. 8 is an example flowchart 800 illustrating the operation of a wireless communication device, such as a network entity, according to a possible embodiment. At 810, a RACH configuration including a MsgA PUSCH configuration can be transmitted. At 820, a particular PRACH preamble and a PUSCH associated with the particular PRACH preamble can be received. The PUSCH can be received according to the MsgA PUSCH configuration. At 830, a PDSCH can be transmitted in response to reception of the particular PRACH preamble and the PUSCH. A MAC PDU of the PDSCH can include a plurality of RARs of a plurality of different RAR formats. Each of the plurality of RARs can correspond to a MAC-subPDU of the MAC PDU.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 9:
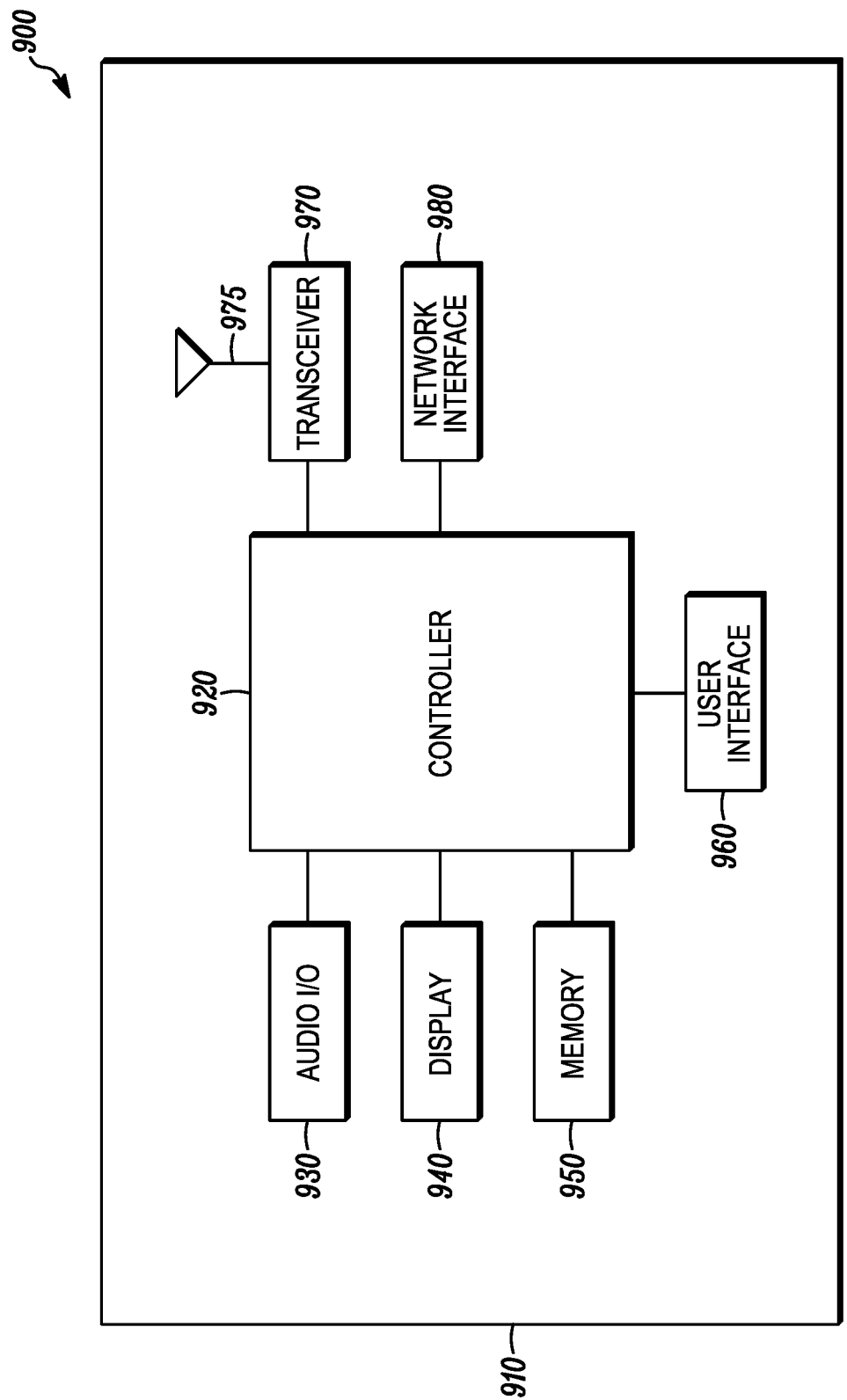
FIG. 9 is an example block diagram of an apparatus according to a possible embodiment.

FIG. 9 is an example block diagram of an apparatus 900, such as the UE 110, the network entity 120, or any other wireless communication device disclosed herein, according to a possible embodiment. The apparatus 900 can include a housing 910, a controller 920 coupled to the housing 910, audio input and output circuitry 930 coupled to the controller 920, a display 940 coupled to the controller 920, a memory 950 coupled to the controller 920, a user interface 960 coupled to the controller 920, a transceiver 970 coupled to the controller 920, at least one antenna 975 coupled to the transceiver 970, and a network interface 980 coupled to the controller 920. The apparatus 900 may not necessarily include all of the illustrated elements for different embodiments of the present disclosure. The apparatus 900 can perform the methods described in all the embodiments.

The display 940 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 970 can be one or more transceivers that can include a transmitter and/or a receiver. The audio input and output circuitry 930 can include a microphone, a speaker, a transducer, or any other audio input and output circuitry. The user interface 960 can include a keypad, a keyboard, buttons, a touch pad, a joystick, a touch screen display, another additional display, or any other device useful for providing an interface between a user and an electronic device. The network interface 980 can be a Universal Serial Bus (USB) port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 950 can include a Random-Access Memory (RAM), a Read Only Memory (ROM), an optical memory, a solid-state memory, a flash memory, a removable memory, a hard drive, a cache, or any other memory that can be coupled to an apparatus.

The apparatus 900 or the controller 920 may implement any operating system, such as Microsoft Windows®, UNIX®, LINUX®, Android™, or any other operating system. Apparatus operation software may be written in any programming language, such as C, C++, Java, or Visual Basic, for example. Apparatus software may also run on an application framework, such as, for example, a Java® framework, a .NET® framework, or any other application framework. The software and/or the operating system may be stored in the memory 950, elsewhere on the apparatus 900, in cloud storage, and/or anywhere else that can store software and/or an operating system. The apparatus 900 or the controller 920 may also use hardware to implement disclosed operations. For example, the controller 920 may be any programmable processor. Furthermore, the controller 920 may perform some or all of the disclosed operations. For example, at least some operations can be performed using cloud computing and the controller 920 may perform other operations. At least some operations can also be performed by computer executable instructions executed by at least one computer processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 920 may be any controller or processor device or devices capable of operating an apparatus and implementing the disclosed embodiments. Some or all of the additional elements of the apparatus 900 can also perform some or all of the operations of the disclosed embodiments.

In operation, the apparatus 900 can perform the methods and operations of the disclosed embodiments. The transceiver 970 can transmit and receive signals, including data signals and control signals that can include respective data and control information. The controller 920 can generate and process the transmitted and received signals and information.

In operation according to a possible embodiment, the transceiver 970 can receive a RACH configuration including a MsgA PUSCH configuration. The controller 920 can determine an association between a PRACH preamble of a plurality of PRACH preambles and a PUSCH of a plurality of PUSCHs. The controller 920 can randomly select a particular PRACH preamble from the plurality of PRACH preambles. The transceiver 970 can transmit the particular PRACH preamble and a PUSCH associated with the particular PRACH preamble. The PUSCH can be transmitted according to the MsgA PUSCH configuration. The transceiver 970 can receive a PDSCH in response to transmission of the particular PRACH preamble and the PUSCH. A MAC PDU of the PDSCH can include a plurality of RARs of a plurality of different RAR formats. Each of the plurality of RARs can correspond to a MAC-subPDU of the MAC PDU.

According to a possible embodiment, the MsgA PUSCH configuration can be a PUSCH configuration used for transmitting a RACH message from the UE to a network entity in a two-step random access procedure. According to a possible embodiment, the MsgA PUSCH configuration can include an indication of whether or not to apply transform precoding to a MsgA PUSCH transmission.

According to a possible embodiment, the PUSCH can be a first PUSCH. The transceiver 970 can transmit a second PUSCH according to an UL grant. A MAC subheader of a RAR of the plurality of RARs can include at least a preamble identity of the particular PRACH preamble. A MAC RAR of the RAR can include at least the UL grant. According to a possible embodiment, the plurality of PRACH preambles and the association between the PRACH preamble of the plurality of PRACH preambles and the PUSCH of the plurality of PUSCHs can be determined based on the RACH configuration.

According to a possible embodiment, the RACH configuration can include a configuration of a plurality of reserved PRACH preambles. The plurality of PRACH preambles may not include any of the plurality of reserved PRACH preambles. According to a possible embodiment, a particular RAR format of the plurality of RAR formats can include a preamble identity of a particular reserved PRACH preamble of the plurality of reserved PRACH preambles.

According to a possible embodiment, the controller 920 can determine a transmit power of the PUSCH associated with the particular PRACH preamble based on a default power adjustment state, l=0, and an initial value, $f_{b,f,c}(0, 1)$ of the default power adjustment state for closed-loop power control, which can be based on $$\Delta P_{rampup,b,f,c} = \min\left[\left\{\max\left(0, P_{CMAX,f,c} - \left(\begin{array}{c}10\log_{10}(2^\mu \cdot M_{RB,b,f,c}^{PUSCH}(0)) + \\ P_{O\_PUSCH,b,f,c}(0) + \alpha_{b,f,c}(0) \cdot \\ PL_c + \Delta_{TF,b,f,c}(0)\end{array}\right)\right)\right\}, \Delta P_{rampuprequested,b,f,c}\right]$$

$\Delta P_{rampuprequested,b,f,c}$ can be provided by higher layers and can correspond to the total power ramp-up requested by the higher layers from a first to a latest random access preamble for an active UL BWP b of a carrier f in a serving cell c. The higher layers can be higher than a physical layer. $M_{RB,b,f,c}^{PUSCH}(0)$ can be a bandwidth of a PUSCH resource assignment corresponding to the PUSCH expressed in number of resource blocks on the active UL BWP b of the carrier f of the serving cell c. $\Delta_{TF,b,f,c}(0)$ can be a power adjustment of the PUSCH associated with the particular PRACH preamble transmission on the active UL BWP b of carrier f of the serving cell c. $P_{CMAX,f,c}$ can be a UE configured maximum output power for the carrier f of the serving cell c in a PUSCH transmission occasion of the PUSCH. $P_{O\_PUSCH, b, f, c}(0)$ and $\alpha_{b,f,c}(0)$ can be open-loop power control parameters for the active UL BWP b of the carrier f of the serving cell c. $PL_c$ can denote a pathloss of the serving cell c.

According to a possible embodiment a method at a UE can include receiving association information between a reserved PRACH preamble of a plurality of reserved preambles and a MAC RAR format of a plurality of MAC RAR formats. The method can include transmitting a PRACH preamble and a PUSCH associated with the transmitted PRACH preamble. The method can include receiving a RAR corresponding to the transmitted PRACH preamble and the transmitted PUSCH, wherein the RAR can include a plurality of PRACH preamble identities and a corresponding plurality of MAC RARs.

According to different embodiments, the RAR can include a plurality of MAC-subheaders and each of the plurality of PRACH preamble identities can be included in each of the plurality of MAC-subheaders. The plurality of MAC RARs can have the same size. Each of the plurality of MAC RARs can be based on a distinctive MAC RAR format from the plurality of MAC RAR formats. The plurality of PRACH preamble identities can include a preamble identity of the transmitted PRACH preamble. The plurality of PRACH preamble identities can include a preamble identity of a reserved PRACH preamble. The method can include determining a MAC RAR format of a MAC RAR corresponding to the reserved preamble identity based on the received association information.

At least some methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

At least some embodiments can improve operation of the disclosed devices. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method at a user equipment, the method comprising:
   receiving a random access channel configuration including a MsgA physical uplink shared channel configuration;
   determining an association between a physical random access channel preamble of a plurality of physical random access channel preambles and a physical uplink shared channel of a plurality of physical uplink shared channels;
   randomly selecting a particular physical random access channel preamble from the plurality of physical random access channel preambles;
   transmitting the particular physical random access channel preamble and a physical uplink shared channel associated with the particular physical random access channel preamble, wherein the physical uplink shared channel is transmitted according to the MsgA physical uplink shared channel configuration; and
   receiving a physical downlink shared channel in response to transmission of the particular physical random access channel preamble and the physical uplink shared channel, wherein a medium access control protocol data unit of the physical downlink shared channel comprises a plurality of random access responses of a plurality of different random access response formats, each of the plurality of random access responses corresponding to a medium access control-subprotocol data unit of the medium access control protocol data unit.

2. The method according to claim 1, wherein the MsgA physical uplink shared channel configuration comprises an indication of whether or not to apply transform precoding to a MsgA physical uplink shared channel transmission.

3. The method according to claim 2, wherein the indication of whether or not to apply transform precoding is received via a higher-layer parameter, where a higher-layer is higher than a physical layer.

4. The method according to claim 1, wherein a random access response format of the plurality of random access response formats corresponds to a 4-step random access procedure.

5. The method according to claim 1, wherein a random access response format of the plurality of random access response formats corresponds to a 2-step random access procedure.

6. The method according to claim 1,
   wherein the physical uplink shared channel comprises a first physical uplink shared channel, and
   wherein the method further comprises transmitting a second physical uplink shared channel according to an uplink grant,
   wherein a medium access control subheader of a random access response of the plurality of random access responses includes at least a preamble identity of the particular physical random access channel preamble, and
   wherein a medium access control random access response of the random access response includes at least the uplink grant.

7. The method according to claim 1, wherein the plurality of physical random access channel preambles and the association between the physical random access channel preamble of the plurality of physical random access channel preambles and the physical uplink shared channel of the plurality of physical uplink shared channels are determined based on the random access channel configuration.

8. The method according to claim 1, wherein the random access channel configuration further comprises a configuration of a plurality of reserved physical random access channel preambles, where the plurality of physical random access channel preambles does not include any of the plurality of reserved physical random access channel preambles.

9. The method according to claim 8, wherein a particular random access response format of the plurality of random access response formats comprises a preamble identity of a particular reserved physical random access channel preamble of the plurality of reserved physical random access channel preambles.

10. The method according to claim 9, further comprising determining a content of a random access response of the particular random access response format based on the particular reserved physical random access channel preamble,
    wherein the configuration of the plurality of reserved physical random access channel preambles further comprises association information of an association between a reserved physical random access channel preamble of the plurality of reserved physical random access channel preambles and a random access response format of the plurality of different random access response formats, and
wherein the content of the random access response is determined based on the particular random access response format associated with the particular reserved physical random access channel preamble.

11. The method according to claim 1, further comprising determining a transmit power of the physical uplink shared channel associated with the particular physical random access channel preamble based on a default power adjustment state, l=0, where an initial value, $f_{b,f,c}(0, 1)$, of the default power adjustment state for closed-loop power control is based on $$\Delta P_{rampup,b,f,c} = \left[ \min \left\{ \max \left( 0, P_{CMAX,f,c} - \left( \begin{array}{c} 10\log_{10}(2^\mu \cdot M_{RB,b,f,c}^{PUSCH}(0)) + \\ P_{O\_PUSCH,b,f,c}(0) + \alpha_{b,f,c}(0) \cdot \\ PL_c + \Delta_{TF,b,f,c}(0) \end{array} \right) \right) \right\} \right]_{\Delta P_{rampuprequested,b,f,c}}$$

where $\Delta P_{rampuprequested,b,f,c}$ is provided by higher layers, where the higher layers are higher than a physical layer, and corresponds to the total power ramp-up requested by the higher layers from a first to a latest random access preamble for an active uplink bandwidth part b of a carrier f in a serving cell c, where $M_{RB,b,f,c}^{PUSCH}(0)$ is a bandwidth of a physical uplink shared channel resource assignment corresponding to the physical uplink shared channel expressed in number of resource blocks on the active uplink bandwidth part b of the carrier f of the serving cell c, where $\Delta_{TF,b,f,c}(0)$ is a power adjustment of the physical uplink shared channel associated with the particular physical random access channel preamble transmission on the active uplink bandwidth part b of carrier f of the serving cell c, where $P_{CMAX,f,c}$ is a user equipment configured maximum output power for the carrier f of the serving cell c in a physical uplink shared channel transmission occasion of the physical uplink shared channel, where $P_{O\_physical\ uplink\ shared\ channel,\ b,\ f,\ c}(0)$ and $\alpha_{b,f,c}(0)$ are open-loop power control parameters for the active uplink bandwidth part b of the carrier f of the serving cell c, and where $PL_c$ denotes a pathloss of the serving cell c.

12. The method according to claim 1, wherein a random access response format of the plurality of different random access response formats comprises two consecutive medium access control-subprotocol data units.

13. An apparatus comprising:
a transceiver that receives a random access channel configuration including a MsgA physical uplink shared channel configuration; and
a controller coupled to the transceiver, where the controller
determines an association between a physical random access channel preamble of a plurality of physical random access channel preambles and a physical uplink shared channel of a plurality of physical uplink shared channels, and
randomly selects a particular physical random access channel preamble from the plurality of physical random access channel preambles,
wherein the transceiver
transmits the particular physical random access channel preamble and a physical uplink shared channel associated with the particular physical random access channel preamble, wherein the physical uplink shared channel is transmitted according to the MsgA physical uplink shared channel configuration, and
receives a physical downlink shared channel in response to transmission of the particular physical random access channel preamble and the physical uplink shared channel, wherein a medium access control protocol data unit of the physical downlink shared channel comprises a plurality of random access responses of a plurality of different random access response formats, each of the plurality of random access responses corresponding to a medium access control-subprotocol data unit of the medium access control protocol data unit.

14. The apparatus according to claim 13, wherein the MsgA physical uplink shared channel configuration comprises an indication of whether or not to apply transform precoding to a MsgA physical uplink shared channel transmission.

15. The apparatus according to claim 13,
wherein the physical uplink shared channel comprises a first physical uplink shared channel, and
wherein the transceiver transmits a second physical uplink shared channel according to an uplink grant,
wherein a medium access control subheader of a random access response of the plurality of random access responses includes at least a preamble identity of the particular physical random access channel preamble, and
wherein a medium access control random access response of the random access response includes at least the uplink grant.

16. The apparatus according to claim 13, wherein the plurality of physical random access channel preambles and the association between the physical random access channel preamble of the plurality of physical random access channel preambles and the physical uplink shared channel of the plurality of physical uplink shared channels are determined based on the random access channel configuration.

17. The apparatus according to claim 13, wherein the random access channel configuration further comprises a configuration of a plurality of reserved physical random access channel preambles, where the plurality of physical random access channel preambles does not include any of the plurality of reserved physical random access channel preambles.

18. The apparatus according to claim 17, wherein a particular random access response format of the plurality of random access response formats comprises a preamble identity of a particular reserved physical random access channel preamble of the plurality of reserved physical random access channel preambles.

19. The apparatus according to claim 13, wherein the controller determines a transmit power of the physical uplink shared channel associated with the particular physical random access channel preamble based on a default power adjustment state, l=0, where an initial value, $f_{b,f,c}(0, 1)$, of the default power adjustment state for closed-loop power control is based on $$\Delta P_{rampup,b,f,c} =$$

$$\min\left[\left\{\max\left(0, P_{CMAX,f,c} - \begin{pmatrix} 10\log_{10}(2^{\mu} \cdot M_{RB,b,f,c}^{PUSCH}(0)) + \\ P_{O\_PUSCH,b,f,c}(0) + \alpha_{b,f,c}(0) \cdot \\ PL_c + \Delta_{TF,b,f,c}(0) \end{pmatrix}\right)\right\}, \Delta P_{rampuprequested,b,f,c}\right]$$

where $\Delta P_{rampuprequested,b,f,c}$ is provided by higher layers, where the higher layers are higher than a physical layer, and corresponds to the total power ramp-up requested by the higher layers from a first to a latest random access preamble for an active uplink bandwidth part b of a carrier f in a serving cell c, where $M_{RB,b,f,c}^{PUSCH}(0)$ is a bandwidth of a physical uplink shared channel resource assignment corresponding to the physical uplink shared channel expressed in number of resource blocks on the active uplink bandwidth part b of the carrier f of the serving cell c, where $\Delta_{TF,b,f,c}(0)$ is a power adjustment of the physical uplink shared channel associated with the particular physical random access channel preamble transmission on the active uplink bandwidth part b of carrier f of the serving cell c, where $P_{CMAX,f,c}$ is a user equipment configured maximum output power for the carrier f of the serving cell c in a physical uplink shared channel transmission occasion of the physical uplink shared channel, where $P_{O\_physical\ uplink\ shared\ channel,\ b,\ f,\ c}(0)$ and $\alpha_{b,f,c}(0)$ are open-loop power control parameters for the active uplink bandwidth part b of the carrier f of the serving cell c, and where $PL_c$ denotes a pathloss of the serving cell c.

20. The apparatus according to claim 13, wherein a random access response format of the plurality of different random access response formats comprises two consecutive medium access control-subprotocol data units.

* * * * *